United States Patent [19]

Tesch

[11] Patent Number: 4,820,574

[45] Date of Patent: Apr. 11, 1989

[54] FILLING MATERIAL FOR CUSHIONS AND COVERS

[75] Inventor: Günter Tesch, Fribourg, Switzerland

[73] Assignee: Gunter Tesch, Fribourg, Switzerland

[21] Appl. No.: 89,403

[22] Filed: Aug. 26, 1987

[30] Foreign Application Priority Data

Aug. 29, 1986 [CH] Switzerland ........................ 03468/86

[51] Int. Cl.[4] .......................... B32B 5/02; D03D 3/00

[52] U.S. Cl. .................................... 428/234; 428/109; 428/218; 428/228; 428/222; 428/227; 428/284; 428/357; 428/369; 428/370; 428/371; 428/402; 428/359; 428/362

[58] Field of Search ............... 428/369, 370, 371, 218, 428/220, 222, 227, 234, 284, 402, 357, 109, 234, 357, 359

[56] References Cited

U.S. PATENT DOCUMENTS 4,413,030 11/1983 Tesch et al. .......................... 428/85
4,481,247 11/1984 Tesch et al. .......................... 428/234

*Primary Examiner*—Lorraine T. Kendell
*Attorney, Agent, or Firm*—Bacon & Thomas

[57] ABSTRACT

A filler material for cushions and covers, in particular with spherical fiber aggregates wherein individual cut fibers are intertwined, is described. The fiber aggregates are capable of forming connections with others parts of the filler material. The connection is burr-like and is releasable. This may be obtained, for example, by the individual fiber ends (3) which project from the surface of the otherwise spherical fiber aggregate (1). In this manner a filler material for cushions and covers is obtained, in which the fiber aggregates do not shift or slide excessively within a covering, in particular a pillow, so that an adequate and permanent support for the head of a person is provided.

13 Claims, 1 Drawing Sheet

FILLING MATERIAL FOR CUSHIONS AND COVERS

This invention concerns a filler material for cushions and covers. More particularly, the filler material comprises a fiber aggregate, which is preferably generally spherical in shape, and which has individual cut fibers which are intertwined with each other.

A filler material of molded articles with a round cross-section is known from DE-B No. 2 301 913. This filler material is thus molded of spherical fiber aggregates, with individual filaments having a minimum length of 200 mm being used to produce the individual fiber aggregates. During manufacture, the individual filaments are separated from each other by a flow of gas which is blown into a vessel with perforated walls and containing the fibers. The fibers are rotated by eccentrically blowing in a flow of gas into a vessel while forming a spherical molded fiber aggregate. The fiber aggregate which is formed in this manner has a higher density in its spatially outer areas than in the core area. Synthetic fibers of polyamide, polyester, polyacrylic acid, polyvinyl alcohol, polyvinylidene chloride, polyurethane or polyvinylchloride are used for these aggregates. Mixtures of different synthetic fibers may also be used, the fibers differing particularly in their thermoplastic properties.

Due to the mutual fastening (fusion) of the filaments at their points of contact, these known aggregates cannot hook into or penetrate each other. Although such fiber aggregates have properties that are similar to (elder) down with respect to their great bulk, compressive elasticity, softness, thermal insulating characteristics, light weight and good adaptation to the body to be covered, they have the disadvantage that the individual spherical aggregates are easily shifted within a cushion or cover. This shifting takes place particularly if siliconized fibers are used. This is a particular disadvantage in pillows as in actual use, i.e., when a person rests his head on the pillow, the aggregates shift within the pillow, and while the person is sleeping fewer and fewer fiber aggregates remain under his head. In this manner, such a pillow "settles" when slept on and no longer supports the head, which now is resting hard on the mattress.

It is therefore an object of the invention to create a filler material for cushions and covers, whereby the fiber aggregates within a covering (in particular a pillow) do not shift excessively relative to each other, so that the filler material performs its intended function. In the case of a pillow, the head is provided with an adequate and permanent support. This object is attained by the filler material according to the invention which is characterized in that the fiber aggregates are capable of forming connections with other parts of the filler material, and in particular a chain-like connection with other parts of the filler material which includes other aggregates. This connection may be releasable. In this manner adjacent fiber aggregates may connect with each other and the free sliding of individual fiber aggregates relative to each other is prevented. The individual fiber aggregates are not appreciably shifted relative to each other by an impact on the cushion containing the fiber aggregate filler material of the invention. On the other hand, the fiber aggregates may be released from each other, for example, by vigorously shaking the cushion (pillow) filled with the filler material. It is further possible to change the arrangement of individual fiber aggregates or of accumulations of fiber aggregates relative to other accumulations by seizing a certain volume of fiber aggregates through the cushion (pillow case and/or in the pillow case).

These are properties of a fiber aggregate in which the individual fiber ends project over the surface of an otherwise spherical fiber aggregate, particularly if the projecting fibers are hook-shaped at their ends. The projecting fiber ends of a fiber aggregate penetrate into the adjacent fiber aggregates, thereby establishing a connection between them.

According to one embodiment of the invention, a fiber aggregate comprises individual cut fibers which are intertwined with each other, wherein individual fiber ends project from the surface of the fiber aggregate. The fiber aggregate may also preferably comprise a mixture of fibers, one type of which projects from the spherical fiber aggregate. The projecting fibers consist of fibers that are more stiff than the other fibers of the aggregate. These stiffer fibers cannot be integrated as readily as the others in the aggregate and are therefore projecting over its surface.

Although the fiber aggregates are advantageously spheres, they may have other configurations; they may be, for example, worm-shaped or ovaloid. The fiber aggregates may contain wool fibers. In particular, these are spheres of a mixture of wool fibers and straight hairs, preferably with a hair content of about 20%. However, fiber aggregates of a mixture of animal hairs, wool and synthetic fibers may also be present.

According to a particular embodiment of the filler material, in addition to the fiber aggregates with projecting fiber ends, additional nonadhering other filler parts may also be provided. By the choice of the mixing ratio of adhering and nonadhering filler parts, the coherence of the entire filler material may be adjusted. These other filler parts may be fiber aggregates with an essentially smooth surface; they may consist in particular of spherical fiber aggregates such as those known from the state of the art. Other filler materials may, however, consist of feathers, down or the like.

Further details of the invention will become apparent from the examples presented below with reference to the drawing.

Figure 1:
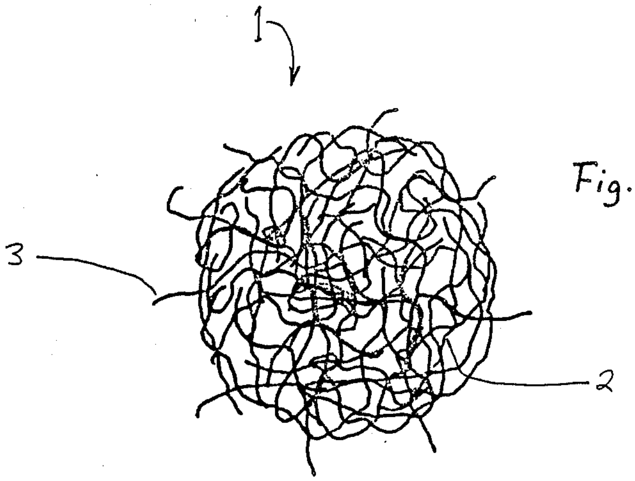
FIG. 1 is a representation of a spherical fiber aggregate from which shorter fiber ends are projecting.

Both figures show a spherical fiber aggregate 1 in section as part of a filler material for cushions and covers, comprising a plurality of fibers 2 intertwined three-dimensionally. For the sake of clarity, the drawing shows only part of the fibers 2. The packing of the fibers 2 in the fiber aggregate 1 is naturally more dense than can be shown in the drawing. These fibers may be natural fibers, such as wool fibers, animal hairs or synthetic fibers, for example of polyamide or polyester or a mixture of them.

The fiber aggregates 1 may be prepared as described, for example, in EP-A No. 0.013.327 or U.S. Pat. No. 4,413,030.

The fibers 2 are present in the form of finite cut fibers and have a length of at least 15 mm. A length range of 40 to 80 mm is preferred. The individual spherical fiber aggregates 1 have a diameter between 3 mm and 40 mm. Elongated (ovaloid) fiber aggregates 1 may have a thickness of, for example, 5 mm and a length of 50 mm.

Fiber aggregates of different sizes may be contained in the same filling.

The fiber aggregates 1 shown in the drawing contain in addition to the fibers 2 forming a spherical shape aggregate, a number of further fibers which project with their ends 3 from the spherically shaped fiber aggregate. These projecting fiber ends 3 may have the form of hooks with V or U-shaped configurations, or the fiber ends may also be in the form of corkscrews.

Figure 2:
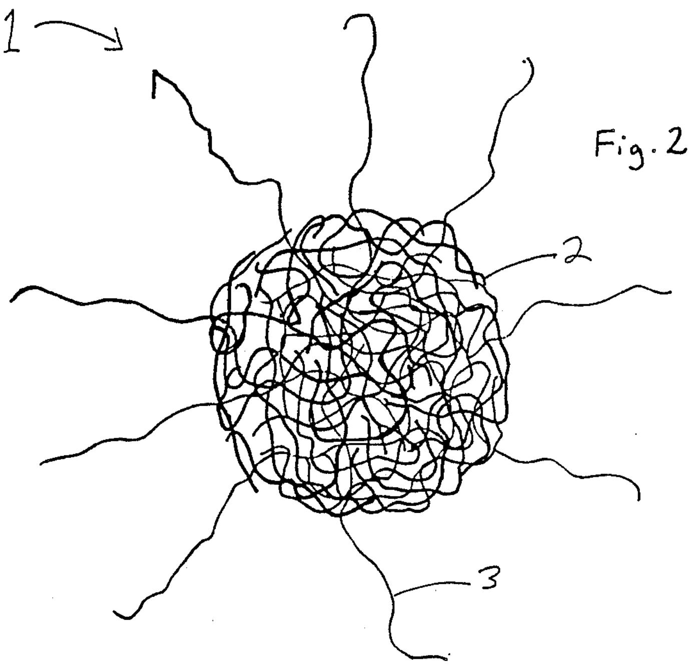
FIG. 2 is a representation of a spherical fiber aggregate from which longer fiber ends are projecting.

The fiber aggregate 1 according to FIG. 1 has shorter fiber ends 3 than the fiber aggregate 1 of FIG. 2. The projecting fiber ends 3 may be of a length corresponding to about one-half of the fibers 2 of the corresponding fiber aggregate 1, i.e., if the fibers of the aggregate 1 are, for example, 40 mm long, the fiber ends 3 are preferably projecting with a length of 20 mm from the spherical shape. However, if the ends are corkscrew-like they appear to be shorter.

The projecting fiber ends 3 are able to penetrate into adjacent fiber aggregates 1 or into other adjacent filler parts and form a releasable burr-like connection with them. In particular, corkscrew shaped fiber ends 3 may intertwine among themselves to form a joint or connection between two fiber aggregates. Pointed fiber ends, on the other hand, may simply penetrate the adjacent fiber aggregates 1 or filler parts.

Fiber aggregates 1 may have densities of about 1 g/cm$^3$. Fiber aggregates 1 of a higher density hold better and have fewer fiber ends 3 than fiber aggregates 1 with lower densities.

In this manner a supporting bolster may be formed simply, but one that is readily supported if so desired. A reversible cohesion of the fiber aggregates 1 among themselves is thereby obtained, which is not possible with the known fiber aggregates. In the filler material, the fiber aggregates will form a three-dimensional interconnected network.

The filler material may also contain other filler parts, such as the known non-burring fiber aggregates, down, feathers, plastic foam particles, or the like. These filler parts are also able to form releasable joints with the fiber ends of the fiber aggregates.

I claim:

1. A filler material for cushions and covers comprising fiber aggregates containing individual cut fibers which are intertwined with each other, characterized in that the fiber aggregates are able to form connections with other parts of the filler material, wherein the individual fiber ends are projecting from the surface of the fiber aggregate which has a spherical shape, the projecting fiber ends forming releasable connections.

2. A filler material according to claim 1, wherein the projecting fibers have hook-shaped ends.

3. A filler material according to claim 1 wherein the fiber aggregate consists of a mixture of fibers, one type of which is projecting from the spherical fiber aggregate.

4. A filler material according to claim 1 wherein the projecting fibers are fibers that are stiffer than the non-projecting fibers of the aggregate.

5. A filler material according to claim 2, wherein the fiber aggregates are spheres.

6. A filler material according to claim 1, wherein the fiber aggregates contain wool fibers.

7. A filler material according to claim 1, wherein the fiber aggregates are spheres consisting of a mixture of wool fibers and straight hairs.

8. A filler material according to claim 1, wherein the fiber aggregates are spheres consisting of a mixture of wool and synthetic fibers.

9. A filler material according to claim 1, which contains in addition to the fiber aggregates with projecting fiber ends other not burr-like filler parts.

10. A filler material according to the preceding claim, which contains other filler parts which are spherical fiber aggregates with an essentially smooth surface.

11. A filler material according to claim 9, wherein the other filler materials are feathers, down, or plastic foam particles.

12. A filler material according to claim 7, wherein the straight hairs comprise about 20% of the fiber aggregate.

13. A cushion or cover containing the filler material of claim 1.

* * * * *